(12) United States Patent
Shi (10) Patent No.: US 11,310,103 B2
(45) Date of Patent: Apr. 19, 2022

(54) METHOD FOR HANDLING RADIO LINK FAILURE (RLF) AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/987,938

(22) Filed: Aug. 7, 2020

(65) Prior Publication Data

US 2020/0366551 A1      Nov. 19, 2020

Related U.S. Application Data

(63) Continuation of application No. PCT/CN2018/075871, filed on Feb. 8, 2018.

(51) Int. Cl.
*H04L 1/08* (2006.01)
*H04L 41/0677* (2022.01)
(Continued)

(52) U.S. Cl.
CPC ............ *H04L 41/0677* (2013.01); *H04L 1/08* (2013.01); *H04L 69/324* (2013.01)

(58) Field of Classification Search
CPC ....... H04L 1/08; H04L 1/1854; H04L 1/1896; H04L 1/22; H04L 41/0677; H04L 69/324;
(Continued)

(56) References Cited

U.S. PATENT DOCUMENTS

2015/0133122 A1    5/2015  Chen
2016/0037579 A1    2/2016  Jung et al.
(Continued)

FOREIGN PATENT DOCUMENTS

CN      102223730        10/2011
CN      102223730 A      10/2011
(Continued)

OTHER PUBLICATIONS

The Notice of Allowance of corresponding Russian application No. 2020129459, dated Apr. 26, 2021.
(Continued)

*Primary Examiner* — Kevin C. Harper
*Assistant Examiner* — Derrick V Rose
(74) *Attorney, Agent, or Firm* — Ladas & Parry LLP (57) ABSTRACT

Embodiments of the present application disclose a method for handling a radio link failure RLF and a terminal device. The method includes: in a case that data of a first radio bearer reaches a maximum number of retransmissions on a first radio link control RLC entity corresponding to the first radio bearer, deactivating, by a terminal device, a replication data transmission function of the first radio bearer, and/or, deactivating, by a terminal device, a replication data transmission function of a second radio bearer, where a carrier mapped by an RLC entity corresponding to the second radio bearer at least partially overlaps with a carrier mapped by the first RLC entity.

19 Claims, 3 Drawing Sheets

(51) Int. Cl.
*H04W 76/19* (2018.01)
*H04L 69/324* (2022.01)

(58) Field of Classification Search
CPC ......... H04L 5/00; H04W 76/11; H04W 76/15; H04W 76/19
See application file for complete search history.

(56) References Cited

U.S. PATENT DOCUMENTS

| 2020/0119864 | A1* | 4/2020 | Xu | H04L 1/08 |
| 2020/0120522 | A1* | 4/2020 | Xiao | H04W 76/15 |

FOREIGN PATENT DOCUMENTS

| CN | 102334369 A | 1/2012 |
| CN | 103201977 | 7/2013 |
| CN | 103201977 A | 7/2013 |
| CN | 103581941 A | 2/2014 |
| CN | 103581942 | 2/2014 |
| CN | 103581942 A | 2/2014 |
| CN | 105393582 A | 3/2016 |
| CN | 107438976 | 12/2017 |
| CN | 107438976 A | 12/2017 |
| CN | 107567041 | 1/2018 |
| CN | 107567041 A | 1/2018 |
| RU | 2602981 C2 | 11/2016 |
| RU | 2640397 C2 | 1/2018 |
| WO | 2014163436 A1 | 10/2014 |
| WO | WO 2014163436 | 10/2014 |
| WO | 2015008962 A1 | 1/2015 |

OTHER PUBLICATIONS

The Notice of Allowance of corresponding Chinese application No. 201880036968.6, dated May 7, 2021.
The first Office Action of corresponding European application No. 18905794.6, dated May 21, 2021.
The EESR of corresponding European application No. 18905794.6, dated Jan. 21, 2021.
CATT:"RLC failure and RLF", 3GPP Draft; R2-1706394_Failure and RLF V3, 3rd Generation Partnership Project (3GPP), Mobile Competence Centre; 650, Route Des Lucioles; F-06921 Sophia-Antipolis Cedex: France, vol. RAN WG2, no. Qingdao, China; Jun. 27, 2017-Jun. 29, 2017 Jun. 16, 2017(Jun. 12, 2017), XP051306425.
The second Office Action of corresponding Chinese application No. 201880036968.6. dated Feb. 3, 2021.
International Search Report(ISR) dated Nov. 5, 2018 for Application No. PCT/CN2018/075871.
3GPP TSG-RAN WG2 NR Ad hoc 0118 R2-1800892; Jan. 26, 2018; Vivo; UE layer-2 behaviors at SCell-failure; 1-4 pages; 1-17 Claims.
3GPP TSG-RAN WG2 #99 R2-1707746; Aug. 25, 2017; OPPO; RLF on the duplication leg; All of the pages; 1-17 Claims.
3GPP TSG-RAN WG2 Meeting #99 R2-1707923; Aug. 25, 2017; CATT; RLC failure and RLF in CA; All of the pages; 1-17 Claims.
The First Office Action of corresponding Chinese application No. 201880036968.6, dated Jun. 16, 2020.
CN 103201977 A (Qualcomm Inc.) Jul. 10, 2013 (Jul. 10, 2013) see description, paragraphs [0105]-[0113], and figures 7-8.
CN 107438976 A (Beijing Xiaomi Mobile Software Co., Ltd.) Dec. 5, 2017 (Dec. 5, 2017) see description, paragraphs [0007]-[0010], and [0165]-[0180].
CN 105393582 A (LG Electronics Inc.) Mar. 9, 2016 (Mar. 9, 2016) entire document.
CN 102334369 A (Alcatel-Lucent Shanghai Bell Co., Ltd.) Jan. 25, 2012 (Jan. 25, 2012) entire document.
«3GPP TSG-RAN WG2 NR Ad hoc 0118 R2-1800892» Vivo, "UE layer-2 behaviors at SCell-failure". Jan. 26, 2018.
«3GPP TSG-RAN WG2 NR20180126 Ad hoc 0118 R2-1800892», VIVO "UE layer-2 behaviors at SCell-failure", 页 1-4 页, 1-17.
«3GPP TSG RAN WG2 #9920170825 R2-1707746», OPPO "RLF on the duplication leg", 正文, 1-17.
«3GPP TSG-RAN WG2201708285 Meeting #99 R2-1707923», CATT "RLC failure and RLF in CA", 正文, 1-17.

* cited by examiner

FIG. 5

METHOD FOR HANDLING RADIO LINK FAILURE (RLF) AND TERMINAL DEVICE

CROSS-REFERENCE TO RELATED APPLICATIONS

This application is a continuation of International Application No. PCT/CN2018/075871, filed on Feb. 8, 2018, the disclosure of which is hereby incorporated by reference in its entirety.

TECHNICAL FIELD

Embodiments of the present disclosure relate to the field of communications and, in particular, relate to a method for handling a radio link failure RLF and a terminal device.

BACKGROUND

In the scenario of carrier aggregation, a packet data convergence protocol (Packet Data Convergence Protocol, PDCP) entity corresponding to a radio bearer can support a replication data transmission function, that is, to replicate one PDCP protocol data unit (Protocol Data Unit, PDU) into two, so as to improve the reliability of data transmission. It has not been involved in the current discussion how a terminal device should deal with a radio link failure (Radio Link Failure, RLF) that occurs in the case that the replication data transmission function of a certain radio bearer is in an active state.

SUMMARY

In view of this, embodiments of the present application provide a method for handling a radio link failure RLF and a terminal device, which is beneficial to the improvement of the reliability of data transmission.

In a first aspect, a method for handling a radio link failure RLF is provided, where the method includes: in a case that data of a first radio bearer reaches a maximum number of retransmissions on a first radio link control RLC entity corresponding to the first radio bearer, deactivating, by a terminal device, a replication data transmission function of the first radio bearer, and/or, deactivating, by a terminal device, a replication data transmission function of a second radio bearer, where a carrier mapped by an RLC entity corresponding to the second radio bearer at least partially overlaps with a carrier mapped by the first RLC entity.

In a possible implementation, the deactivating, by the terminal device, the replication data transmission function of the first radio bearer includes: stopping, by the terminal device, a packet data convergence protocol PDCP entity of the first radio bearer from replicating a PDCP protocol data unit PDU; stopping, by the terminal device, delivering data to the first RLC entity, and delivering, by the terminal device, data to a second RLC entity corresponding to the first radio bearer.

In a possible implementation, the method further includes: sending, by the terminal device, indication information to a network device, where the indication information is used to indicate that a radio link failure RLF occurs on the first radio bearer, and/or to indicate an identifier of a radio bearer whose replication data transmission function is deactivated by the terminal device.

In a possible implementation, the first radio bearer and the second radio bearer correspond to a same cell group or to different cell groups.

In a possible implementation, the cell group includes a master cell group MCG and/or a secondary cell group SCG.

In a possible implementation, an operating mode of the first RLC entity is an acknowledged mode AM, and an operating mode of the RLC entity corresponding to the second radio bearer is an acknowledged mode AM or an unacknowledged mode UM.

In a possible implementation, the first RLC entity is a primary link of the first radio bearer, and the second RLC entity corresponding to the first radio bearer is a secondary link of the first radio bearer; or the first RLC entity is a secondary link of the first radio bearer, and the second RLC entity is a primary link of the first radio bearer.

In a second aspect, a terminal device is provided for executing the above method in the first aspect or in any possible implementation of the first aspect. Specifically, the terminal device includes a unit for executing the above method in the first aspect or in any possible implementation of the first aspect.

In a third aspect, a terminal device is provided, where the terminal device includes: a memory, a processor, an input interface and an output interface. The memory, the processor, the input interface and the output interface are connected through a bus system. The memory is used to store instructions, and the processor is used to execute the instructions stored in the memory so as to execute the above method in the first aspect or in any possible implementation of the first aspect.

In a fourth aspect, a computer storage medium is provided, where the computer storage medium is used to store computer software instructions for executing the above method in the first aspect or in any possible implementation of the first aspect, and the computer software instructions include a program designed to execute the above aspects.

In a fifth aspect, a computer program product including instructions is provided, where the computer program product causes a computer to execute the above method in the first aspect or in any implementation of the first aspect when running on the computer.

These or other aspects of the present application will be more concise and understandable in the description of the following embodiments.

DETAILED DESCRIPTION OF THE EMBODIMENTS

The technical solutions in embodiments of the present application will be described clearly and completely with reference to the drawings in the embodiments of the present application.

It should be understood that the technical solutions of the embodiments of the present application may be applied to various communication systems, such as: a global system of mobile communication (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution LTE system, an LTE frequency division duplex (Frequency Division Duplex, FDD) system, an LTE time division duplex (Time Division Duplex, TDD), a universal mobile telecommunication system (Universal Mobile Telecommunication System, UMTS), a worldwide interoperability for microwave access (Worldwide Interoperability for Microwave Access, WiMAX) communication system, a new radio (New Radio, NR) or future 5G system, etc.

In particular, the technical solutions of the embodiments of the present application may be applied to various communication systems based on non-orthogonal multiple access technology, such as a sparse code multiple access (Sparse Code Multiple Access, SCMA) system, a low density signature (Low Density Signature, LDS) system, etc. Of course, the SCMA system and the LDS system may also be called other names in the communication field. Further, the technical solutions of the embodiments of the present application may be applied to multi-carrier transmission systems using the non-orthogonal multiple access technology, such as orthogonal frequency division multiplexing (Orthogonal Frequency Division Multiplexing, OFDM), filter bank multi-carrier (Filter Bank Multi-Carrier, FBMC), generalized frequency division multiplexing (Generalized Frequency Division Multiplexing, GFDM), filtered-OFDM (Filtered-OFDM, F-OFDM) systems using the non-orthogonal multiple access technology, etc.

The terminal device in the embodiments of the present application may refer to a user equipment (User Equipment, UE), an access terminal, a user unit, a user station, a mobile radio station, a mobile station, a remote station, a remote terminal, a mobile device, a user terminal, a terminal, a wireless communication device, a user agent or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device or a computing device that has a wireless communication function, other processing device connected to a wireless modem, a vehicle-mounted device, a wearable device, a terminal device in a future 5G network, or a terminal device in a future evolved public land mobile network (Public Land Mobile Network, PLMN), etc., which is not limited in the embodiments of the present application.

The network device in the embodiments of the present application may be a device for communicating with a terminal device. The network device may be a base transceiver station (Base Transceiver Station, BTS) in GSM or CDMA, or a NodeB (NodeB, NB) in a WCDMA system; the network device may also be an evolutional NodeB (Evolutional NodeB, eNB or eNodeB) in an LTE system; the network device may also be a wireless controller in a cloud radio access network (Cloud Radio Access Network, CRAN) scenario: or the network device may be a relay station, an access point, a vehicle-mounted device, a wearable device, a network device in a future 5G network, or a network device in a future evolved PLMN network, etc., which is not limited in the embodiments of the present application.

Figure 1:
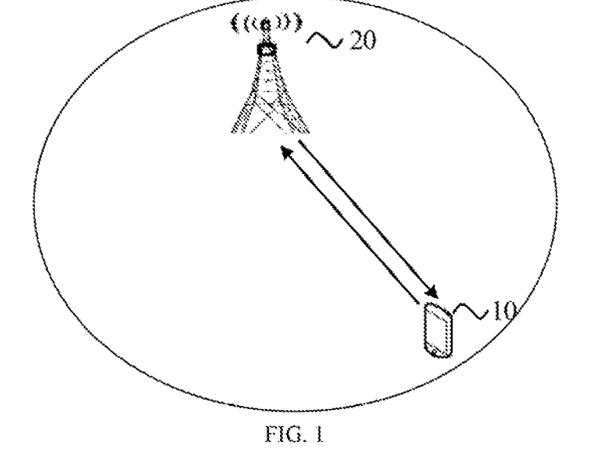
FIG. 1 shows a schematic diagram of an application scenario according to an embodiment of the present application.

FIG. 1 is a schematic diagram of an application scenario according to an embodiment of the present application. A communication system in FIG. 1 may include a terminal device 10 and a network device 20. The network device 20 is used to provide communication services for the terminal device 10 and access a core network, and the terminal device 10 accesses the network by searching for synchronization signals, broadcast signals and the like sent by the network device 20, thereby performing communication with the network. The arrows shown in FIG. 1 may represent uplink/downlink transmissions through cellular links between the terminal device 10 and the network device 20.

In the scenario of carrier aggregation, a PDCP entity can support a data replication function. That is, the data replication function of the PDCP is used, so that the replicated data is transmitted to two radio link control (Radio Link Control, RLC) entities (corresponding to two different logical channel) respectively, and it is finally guaranteed that the replicated PDCP PDUs can be transmitted on different physical-layer aggregated carriers, thereby achieving the frequency diversity gain to improve the reliability of data transmission.

Figure 2:
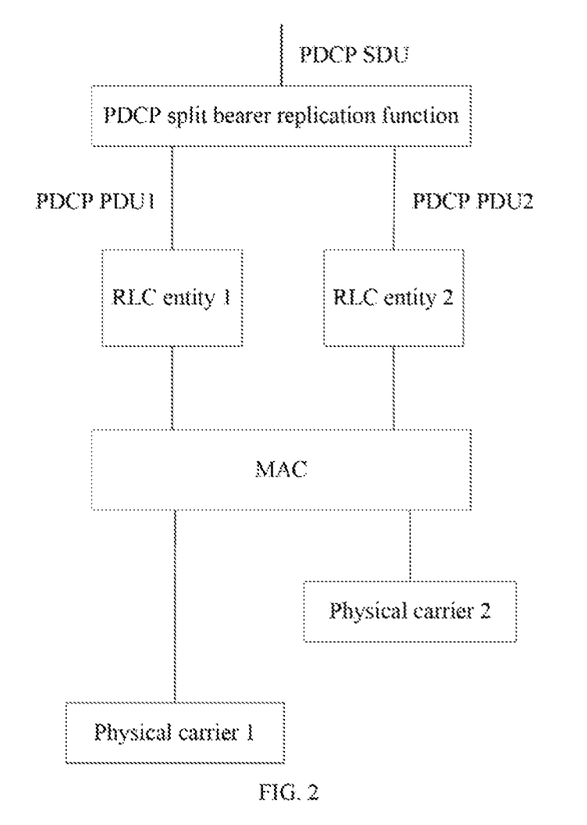
FIG. 2 shows a diagram of a protocol architecture in a scenario of carrier aggregation.

The specific protocol structure will be described below in combination with FIG. 2. As shown in FIG. 2, a PDCP entity corresponding to a certain radio bearer has a split bearer replication function. A data process of a PDCP service data unit (Service Data Unit, SDU) is replicated and encapsulated into a PDCP PDU1 and a PDCP PDU2, where the PDCP PDU1 and the PDCP PDU2 have the same content, that is, both the borne data (payload) and the header (header) are the same. The PDCP PDU1 and the PDCP PDU2 are mapped to different radio link control (Radio Link Control, RLC) entities, that is, the PDCP PDU1 is transmitted to an RLC entity 1, and the PDCP PDU2 is transmitted to an RLC entity 2. Different RLC entities correspond to different logics channels. For media access control (Media Access Control, MAC), after knowing the replicated data of the same PDCP PDU is transmitted on which logical channels, these replicated data are transmitted on different carriers. For example, the replicated data transmitted in the RLC entity 1 is transmitted on a physical carrier 1, and the replicated data transmitted in the RLC entity 2 is transmitted on a physical carrier 2.

It has not been involved in the current discussion how the terminal device deals with a radio link failure RLF that occurs in the case that the replication data transmission function of a certain radio bearer is in an active state.

Figure 3:
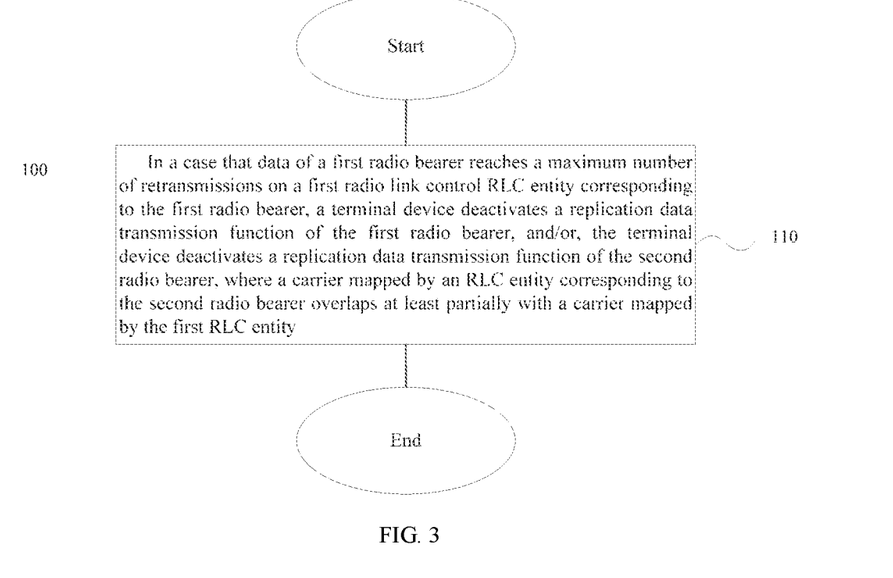
FIG. 3 shows a schematic block diagram of a method for handling a radio link failure RLF according to an embodiment of the present application.

FIG. 3 shows a schematic block diagram of a method 100 for handling a radio link failure RLF according to an embodiment of the present application. As shown in FIG. 3, the method 100 includes:

S110: In a case that data of a first radio bearer reaches a maximum number of retransmissions on a first radio link control RLC entity corresponding to the first radio bearer, a terminal device deactivates a replication data transmission function of the first radio bearer, and/or, the terminal device deactivates a replication data transmission function of a second radio bearer, where a carrier mapped by an RLC entity corresponding to the second radio bearer at least partially overlaps with a carrier mapped by the first RLC entity.

It should be noted that different radio bearers correspond to different PDCP entities; a PDCP entity with a replication data transmission function can be configured to correspond to two RLC entities; and the replication data transmission function of the PDCP entity can also be said to be a replication data transmission function of a radio bearer.

When the replication data transmission function of the first radio bearer is in an active state, the terminal device determines that an RLF occurs on the first radio bearer. In other words, the terminal device may be using the PDCP entity of the first radio bearer to replicate the PDCP PDU, and performing data transmissions through two RLC entities corresponding to the first radio bearer. When the terminal device determines that the RLF occurs on the first radio bearer, the terminal device can deactivate the replication data transmission function of the first radio bearer, so that the terminal device stops using the PDCP entity of the first radio bearer to replicate the PDCP PDU, including uplink PDCP PDU replication and/or downlink PDCP PDU replication; and when new data needs to be transmitted, the terminal device stops using the RLC entity, in which the RLF occurs, corresponding to the first radio bearer to perform the data transmission, and uses an RLC entity, in which no RLF occurs, corresponding to the first radio bearer to perform the data transmission. When the terminal device determines that the RLF occurs on the first radio bearer, the terminal device can also deactivate the replication data transmission function of the second radio bearer. The carrier mapped by the RLC entity corresponding to the first radio bearer at least partially overlaps with the carrier mapped by the RLC entity corresponding to the second radio bearer. For example, the carrier mapped by the RLC entity corresponding to the first radio bearer and the carrier mapped by the RLC entity corresponding to the second radio bearer may be a subset of each other. That is to say, when the RLF occurs on the first radio bearer, the data transmission of the second radio bearer may be affected, and thus the further deactivating of the replication data transmission function of the second radio bearer is beneficial to the improvement of the reliability of performing the data transmission using the second radio bearer.

In an implementation, the case that the RLF occurs on the first radio bearer may be that the data transmitted on the first RLC entity corresponding to the first radio bearer reaches the maximum number of retransmissions, and may also be that the data transmitted on a second RLC entity corresponding to the first radio bearer reaches the maximum number of retransmissions. If the data transmitted on the first RLC entity reaches the maximum number of retransmissions, the terminal device can stop using the first RLC entity to transmit data and directly use the second RLC entity to transmit data. If the data transmitted on the second RLC entity reaches the maximum number of retransmissions, the terminal device can stop using the second RLC entity to transmit data and directly use the first RLC entity to transmit data. If the data transmitted on the first RLC entity reaches the maximum number of retransmissions, the terminal device deactivates the replication data transmission function of the second radio bearer, where the carrier mapped by the RLC entity corresponding to the second radio bearer at least partially overlaps with the carrier mapped by the first RLC entity.

In an implementation the case that the RLF occurs on the first radio bearer may also be that the data transmitted on a certain RLC entity corresponding to a third radio bearer reaches the maximum number of retransmissions, and the carrier mapped by the certain RLC entity corresponding to the third radio bearer can partially overlap with the carrier mapped by the RLC entity corresponding to the first radio bearer.

In an implementation, when the data transmitted on a certain RLC entity reaches the maximum number of retransmissions, it means that the operating mode of the RLC entity may be an acknowledged mode (Acknowledged Mode, AM). In other words, in the RLC AM mode, a retransmission counter corresponding to a certain RLC SDU reaches a configured threshold.

In an implementation, the third radio bearer may have a replication data transmission function, and may also not have a replication data transmission function.

In an implementation, the carrier mapped by the first RLC entity and the carrier mapped by the RLC entity corresponding to the second radio bearer at least partially overlap, for example, they may correspond to at least one same secondary cell. The first radio bearer and the second radio bearer may also belong to the same cell group or different cell groups, for example, a master cell group (Master Cell Group, MCG) and/or a secondary cell group (Secondary Cell Group, SCG).

In an implementation, the operating mode of the RLC entity corresponding to the third radio bearer may be an AM mode or an unacknowledged mode (Unacknowledged Mode, UM).

In an implementation, if a link corresponding to the first RLC entity is a primary link and a link corresponding to the second RLC entity is a secondary link, that is to say, after the replication data transmission function of the first radio bearer is deactivated, it is the first RLC entity that is configured by the network device to be used for data transmission by default, and the RLC entity that is configured by the network device to not be used by default is the second RLC entity.

If an RLF occurs in the primary link, stop delivering data to the RLC entity corresponding to the primary link, and deliver data to the RLC entity corresponding to the secondary link which now automatically becomes the primary link; if an RLF occurs in the secondary link, stop delivering data to the RLC entity corresponding to the secondary link, and deliver data to the RLC entity corresponding to the primary link.

In an implementation, the method further includes that: the terminal device sends indication information to the network device, where the indication information is used to indicate that a radio link failure RLF occurs on the first radio bearer, and/or to indicate an identifier of a radio bearer whose replication data transmission function is deactivated by the terminal device.

In other words, when determining that an RLF occurs on a certain radio bearer, the terminal device can report to the network device, or can also report to the network device that the replication data transmission functions of which radio bearers have been deactivated by the terminal device, for example, the identifiers of these radio bearers can be reported to the network device. The terminal device can report to the network that an RLF occurs on a certain radio bearer, and also report to the network those radio bearers whose replication data transmission function has been deactivated.

It should be understood that the interaction between the network device and the terminal device, related characteristics and functions that are described for the network device correspond to the related characteristics and functions of the terminal device. The relevant content has been described in detail in the above method 100, which will not be repeated here for the sake of brevity.

It should also be understood that in various embodiments of the present application, the sequence numbers of the above processes do not mean the execution order, and should not constitute any limitation on the implementation process of the embodiments of the present application. The execution order of each process should be determined by its function and inherent logic.

It should also be understood that the term "and/or" herein is merely describing an association relationship of associated objects, which indicates that there may be three relationships. For example, A and/or B may indicate three conditions: A exists alone, A and B exist at the same time, and B exists alone. In addition, the character "/" herein generally indicates that the associated objects before and after the character are in an "or" relationship.

The method for handling a radio link failure RLF according to embodiments of the present application is described in detail above, and the apparatus for handling a radio link failure RLF according to embodiments of the present application will be described below in combination with FIGS. 4 and 5. The technical features described in the method embodiments are applicable to the following apparatus embodiments.

Figure 4:
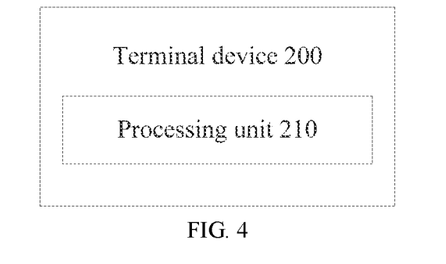
FIG. 4 shows a schematic block diagram of a terminal device according to an embodiment of the present application.

FIG. 4 shows a schematic block diagram of a terminal device 200 according to an embodiment of the present application. As shown in FIG. 4, the terminal device 200 includes:

a processing unit 210, configured to: in a case that data of a first radio bearer reaches a maximum number of retransmissions on a first radio link control RLC entity corresponding to the first radio bearer, deactivate a replication data transmission function of the first radio bearer, and/or, deactivate a replication data transmission function of a second radio bearer, where a carrier mapped by an RLC entity corresponding to the second radio bearer at least partially overlaps with a carrier mapped by the first RLC entity.

Therefore, the terminal device of the embodiment of the present application is beneficial to the improvement of the reliability of data transmission.

In an implementation, in the embodiment of the present application, the processing unit is specifically configured to: stop a packet data convergence protocol PDCP entity of the first radio bearer from replicating a PDCP protocol data unit PDU; and stop delivering data to the first RLC entity, and deliver data to a second RLC entity corresponding to the first radio bearer.

In an implementation, in the embodiment of the present application, the terminal device further includes: a sending unit, configured to send indication information to a network device, where the indication information is used to indicate that a radio link failure RLF occurs on the first radio bearer, and/or to indicate an identifier of a radio bearer whose replication data transmission function is deactivated by the terminal device.

In an implementation, in the embodiment of the present application, the first radio bearer and the second radio bearer correspond to a same cell group or to different cell groups.

In an implementation, in the embodiment of the present application, the cell group includes a master cell group MCG and/or a secondary cell group SCG.

In an implementation, in the embodiment of the present application, an operating mode of the first RLC entity is an acknowledged mode AM, and an operating mode of the RLC entity corresponding to the second radio bearer is an acknowledged mode AM or an unacknowledged mode UM.

In an implementation, in the embodiment of the present application, the first RLC entity is a primary link of the first radio bearer, and the second RLC entity corresponding to the first radio bearer is a secondary link of the first radio bearer; or the first RLC entity is a secondary link of the first radio bearer, and the second RLC entity is a primary link of the first radio bearer.

It should be understood that the terminal device 200 according to the embodiments of the present application may correspond to the terminal device in the method embodiments of the present application. The above and other operations and/or functions of the units in the terminal device 200 are respectively for realizing the corresponding processes of the terminal device in the method of FIG. 3, and will not be repeated here for the sake of brevity.

Figure 5:
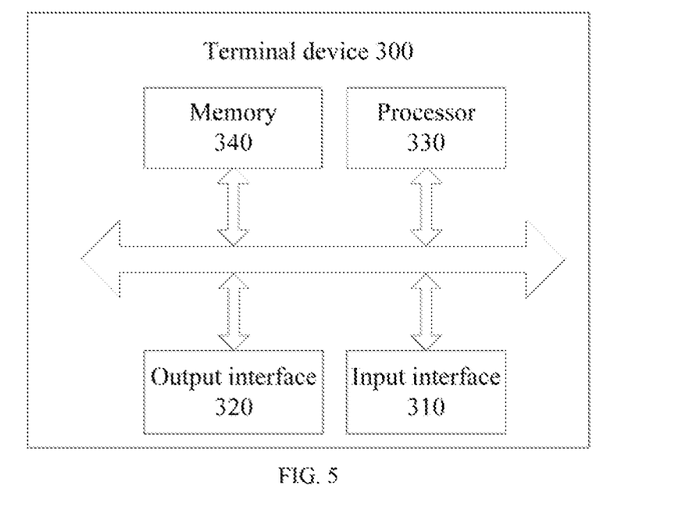
FIG. 5 shows another schematic block diagram of a terminal device according to an embodiment of the present application.

As shown in FIG. 5, an embodiment of the present application further provides a terminal device 300, which may be the terminal device 200 in FIG. 4, and can be used to execute the content of the terminal device corresponding to the method 100 in FIG. 3. The terminal device 300 includes: an input interface 310, an output interface 320, a processor 330 and a memory 340, and the input interface 310, the output interface 320, the processor 330 and the memory 340 can be connected through a bus system. The memory 340 is used to store programs, instructions or codes. The processor 330 is used to execute the programs, instructions or codes in the memory 340 so as to control the input interface 310 to receive signals, control the output interface 320 to send signals, and complete operations in the foregoing method embodiments.

Therefore, the terminal device of the embodiment of the present application is beneficial to the improvement of the reliability of data transmission.

It should be understood that in the embodiments of the present application, the processor 330 may be a central processing unit (Central Processing Unit, CPU), and the processor 330 may also be other general-purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gates or transistor logic devices, discrete hardware components, etc. The general-purpose processor may be a microprocessor or the processor may be any conventional processor or the like.

The memory 340 may include a read-only memory and a random access memory, and provide instructions and data to the processor 330. A portion of the memory 340 may also include a non-volatile random access memory. For example, the memory 340 may also store information of the device type.

In the implementation process, each content of the above method may be completed by an integrated logic circuit of hardware or instructions in the form of software in the processor 330. The content of the method disclosed in combination with the embodiments of the present application may be directly embodied as being completed by the execution by a hardware processor, or may be completed by the execution by a combination of hardware and software modules in the processor. The software modules may be located in a mature storage medium in the art, such as a random access memory, a flash memory, a read-only memory, a programmable read-only memory, an electrically erasable programmable memory, and a register. The storage medium is located in the memory 340, and the processor 330 reads the information in the memory 340, and completes the content of the above method in combination with its hardware. In order to avoid repetition, detailed description will not be given here.

In a specific implementation, the processing unit of the terminal device 200 may be implemented by the processor 330 in FIG. 5, and the sending unit of the terminal device 200 may be implemented by the output interface 320 in FIG. 5.

Those of ordinary skill in the art may realize that the units and algorithm steps of the examples described in combination with the embodiments disclosed herein can be implemented by electronic hardware, or a combination of computer software and electronic hardware. Whether these functions are executed in hardware or software depends on the specific application of the technical solution and design constraint conditions. Professional technicians can use a different method for each specific application to implement the described functions, and such implementation should not be considered beyond the scope of the present application.

Those skilled in the art can clearly understand that for convenience and brevity of the description, the corresponding processes in the foregoing method embodiments can be referred to for the specific working process of the systems, the apparatuses and the units described above, which will not be repeated here.

In the several embodiments provided in the present application, it should be understood that the disclosed systems, apparatuses and methods may be implemented in other ways. For example, the apparatus embodiments described above are merely illustrative. For example, the division of the units is only a logical function division, and in an actual implementation, there may be other division manners, for example, multiple units or components may be combined or may be integrated into another system, or some features can be ignored or not be executed. On the other hand, the mutual coupling or direct coupling or communication connection shown or discussed may be an indirect coupling or communication connection through some interfaces, apparatuses or units, and may be electrical, mechanical or in other forms.

The units described as separate components may or may not be physically separated, and the components displayed as units may or may not be physical units, that is, they may be located in one place, or may be distributed to multiple network units. Some or all of the units may be selected according to actual needs to achieve the purpose of the solutions of the embodiments.

In addition, the functional units in the embodiments of the present application may be integrated into one processing unit, or each unit may exist physically separately, or two or more units may be integrated into one unit.

The functions can be stored on a computer readable storage medium, if the functions are implemented in a form of software function units and sold or used as an independent product. Based on such understanding, the technical solutions of the present application in essence, or a part that contributes to the prior art, or a part of the technical solutions may be embodied in the form of a software product. The computer software product is stored in a storage medium, and includes a number of instructions which are used to cause a computer device (which may be a personal computer, a server, or a network device, etc.) to perform all or part of the steps of the embodiments of the present application. The foregoing storage medium includes various media capable of storing program code, such as a U disk, a mobile hard disk, a read-only memory (Read-Only Memory, ROM), a random access memory (Random Access Memory, RAM), a magnetic disk, or an optical disk, etc.

The above is only the specific embodiments of the present application, and the protection scope of the present application is not limited thereto. Changes or substitutions that can be readily thought of by those skilled in the art within the technical scope disclosed in the present application shall be covered by the protection scope of the present application. Therefore, the protection scope of the present application shall be subject to the protection scope of claims.

What is claimed is:

1. A method for handling a radio link failure (RLF), comprising:
    in a case that data of a first radio bearer reaches a maximum number of retransmissions on a first radio link control (RLC) entity corresponding to the first radio bearer, deactivating, by a terminal device, a replication data transmission function of the first radio bearer, and deactivating, by the terminal device, a replication data transmission function of a second radio bearer, wherein a carrier mapped by an RLC entity corresponding to the second radio bearer at least partially overlaps with a carrier mapped by the first RLC entity.

2. The method according to claim 1, wherein the deactivating, by the terminal device, the replication data transmission function of the first radio bearer comprises:
    stopping, by the terminal device, a packet data convergence protocol (PDCP) entity of the first radio bearer from replicating a PDCP protocol data unit (PDU);
    stopping, by the terminal device, delivering data to the first RLC entity; and delivering, by the terminal device, data to a second RLC entity corresponding to the first radio bearer.

3. The method according to claim 1, wherein the method further comprises:
    sending, by the terminal device, indication information to a network device, wherein the indication information comprises at least one of:
    indication information for indicating that a radio link failure RLF occurs on the first radio bearer, and
    indication information for indicating an identifier of a radio bearer whose replication data transmission function is deactivated by the terminal device.

4. The method according to claim 1, wherein the first radio bearer and the second radio bearer correspond to a same cell group or to different cell groups.

5. The method according to claim 4, wherein the cell group comprises at least one of: a master cell group (MCG) and a secondary cell group (SCG).

6. The method according to claim 1, wherein an operating mode of the first RLC entity is an acknowledged mode (AM), and an operating mode of the RLC entity corresponding to the second radio bearer is an acknowledged mode (AM) or an unacknowledged mode (UM).

7. The method according to claim 1, wherein the first RLC entity is a primary link of the first radio bearer, and the second RLC entity corresponding to the first radio bearer is a secondary link of the first radio bearer; or
    the first RLC entity is a secondary link of the first radio bearer, and the second RLC entity is a primary link of the first radio bearer.

8. A terminal device, comprising: a processor and a memory, wherein the memory is used to store instructions, the processor is used to execute the instructions in the memory and is configured to: in a case that data of a first radio bearer reaches a maximum number of retransmissions on a first radio link control (RLC) entity corresponding to the first radio bearer, deactivate a replication data transmission function of the first radio bearer, and deactivate a replication data transmission function of a second radio bearer, wherein a carrier mapped by an RLC entity corresponding to the second radio bearer at least partially overlaps with a carrier mapped by the first RLC entity.

9. The terminal device according to claim 8, wherein the processor is specifically configured to:
- stop a packet data convergence protocol (PDCP) entity of the first radio bearer from replicating a PDCP protocol data unit (PDU);
- stop delivering data to the first RLC entity, and deliver data to a second RLC entity corresponding to the first radio bearer.

10. The terminal device according to claim 8, wherein the processor is configured to control an output interface to send indication information to a network device, wherein the indication information comprises at least one of:
- indication information for indicating that a radio link failure (RLF) occurs on the first radio bearer, and
- indication information for indicating an identifier of a radio bearer whose replication data transmission function is deactivated by the terminal device.

11. The terminal device according to claim 8, wherein the first radio bearer and the second radio bearer correspond to a same cell group or to different cell groups.

12. The terminal device according to claim 11, wherein the cell group comprises at least one of: a master cell group (MCG) and a secondary cell group (SCG).

13. The terminal device according to claim 8, wherein an operating mode of the first RLC entity is an acknowledged mode (AM), and an operating mode of the RLC entity corresponding to the second radio bearer is an acknowledged mode (AM) or an unacknowledged mode (UM).

14. The terminal device according to claim 8, wherein the first RLC entity is a primary link of the first radio bearer, and the second RLC entity corresponding to the first radio bearer is a secondary link of the first radio bearer; or
- the first RLC entity is a secondary link of the first radio bearer, and the second RLC entity is a primary link of the first radio bearer.

15. A non-transitory computer storage medium, used to store computer software instructions for executing the method for handling a radio link failure (RLF) according to claim 1.

16. The non-transitory computer storage medium according to claim 15, wherein the deactivating, by the terminal device, the replication data transmission function of the first radio bearer comprises:
- stopping, by the terminal device, a packet data convergence protocol (PDCP) entity of the first radio bearer from replicating a PDCP protocol data unit (PDU);
- stopping, by the terminal device, delivering data to the first RLC entity, and delivering, by the terminal device, data to a second RLC entity corresponding to the first radio bearer.

17. The non-transitory computer storage medium according to claim 15, wherein the computer software instructions are further used to execute the following step:
- sending, by the terminal device, indication information to a network device, wherein the indication information comprises at least one of:
- indication information for indicating that a radio link failure (RLF) occurs on the first radio bearer, and
- indication information for indicating an identifier of a radio bearer whose replication data transmission function is deactivated by the terminal device.

18. The non-transitory computer storage medium according to claim 15, wherein the first radio bearer and the second radio bearer correspond to a same cell group or to different cell groups.

19. The non-transitory computer storage medium according to claim 18, wherein the cell group comprises at least one of: a master cell group (MCG) and a secondary cell group (SCG).

* * * * *